United States Patent
Sakurai et al.

(10) Patent No.: US 8,661,789 B2
(45) Date of Patent: Mar. 4, 2014

(54) EXHAUST PURIFICATION SYSTEM FOR INTERNAL COMBUSTION ENGINE

(75) Inventors: Kenji Sakurai, Gotenba (JP); Shigeki Miyashita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 111 days.

(21) Appl. No.: 13/390,610

(22) PCT Filed: Nov. 18, 2009

(86) PCT No.: PCT/JP2009/069549
§ 371 (c)(1),
(2), (4) Date: Feb. 15, 2012

(87) PCT Pub. No.: WO2011/061820
PCT Pub. Date: May 26, 2011

(65) Prior Publication Data
US 2012/0222406 A1    Sep. 6, 2012

(51) Int. Cl.
*F01N 3/00*    (2006.01)
*F01N 3/10*    (2006.01)

(52) U.S. Cl.
USPC ............... 60/285; 60/276; 60/295; 60/301

(58) Field of Classification Search
USPC .................. 60/276, 285, 295, 299, 301
See application file for complete search history.

(56) References Cited

U.S. PATENT DOCUMENTS

| | | | |
|---|---|---|---|
| 6,109,024 A | 8/2000 | Kinugasa et al. | |
| 2002/0116920 A1 | 8/2002 | Pfeifer et al. | |
| 2007/0175208 A1 | 8/2007 | Bandl-Konrad et al. | |

FOREIGN PATENT DOCUMENTS

| | | |
|---|---|---|
| JP | A-07-119447 | 5/1995 |
| JP | A-11-030117 | 2/1999 |
| JP | A-2001-271679 | 10/2001 |
| JP | A-2002-242667 | 8/2002 |
| JP | A-2006-512529 | 4/2006 |
| JP | A-2008-303759 | 12/2008 |
| JP | A-2009-114879 | 5/2009 |
| WO | WO 2009/056958 A1 | 5/2009 |

OTHER PUBLICATIONS

International Search Report in International Application No. PCT/JP2009/069549; dated Feb. 2, 2010 (with English-language translation).

*Primary Examiner* — Thomas Denion
*Assistant Examiner* — Audrey K Bradley
(74) *Attorney, Agent, or Firm* — Oliff PLC

(57) ABSTRACT

An exhaust purification system for an internal combustion engine capable of lean-burn driving comprises: an NSR catalyst disposed in an exhaust passageway; an SCR disposed downstream of the NSR catalyst; a NOx sensor, disposed downstream of the SCR, for producing output in response to NOx concentration; and rich-spike means for causing a rich-spike. When the NOx sensor has produced output indicative of a NOx concentration higher than a given NOx concentration, the system increases the amount of the NOx contained in the exhaust gas discharged during the rich-spike. Under a given high-load condition, the air-fuel ratio is made stoichiometric during the rich-spike caused at a particular timing. Under a given low-load condition, the amount of exhaust gas is increased during the rich-spike.

7 Claims, 4 Drawing Sheets

100: Lack of NH3?
102: High-load operation?
    KL>60, NE>2800rpm?
104: Achieve stoichiometric-spike
106: Low-load operation?
    KL<60, NE<2800rpm?
108: Increase gas quantity during rich-spike
110: NOx emission decreased?

EXHAUST PURIFICATION SYSTEM FOR INTERNAL COMBUSTION ENGINE

TECHNICAL FIELD

The present invention relates to exhaust purification systems for internal combustion engines and particularly to an exhaust purification system for an internal combustion engine having both of a NOx storage reduction catalyst and a NOx selective catalytic reduction.

BACKGROUND ART

A system is known in which the exhaust passageway of an internal combustion engine is provided with a NOx storage-reduction catalyst (hereinafter referred to as an "NSR catalyst"), an example of which is disclosed in JP-A-2001-271679. The NSR catalyst serves the function of adsorbing the nitrogen oxides (NOx) contained in combustion gases discharged from the internal combustion engine, as well as serving the catalytic function of purifying the NOx, hydrocarbons (HC), and the like. When the internal combustion engine is being operated at a lean air-fuel ratio, a NOx-rich exhaust gas is discharged. Thus, the NSR catalyst adsorbs this NOx, thereby preventing the NOx from flowing past the catalyst.

The NOx adsorbed by the NSR catalyst is purified at a particular timing. For instance, the above conventional system is designed to cause a rich-spike by temporarily discharging unburnt gas components from the internal combustion engine. This causes reactions within the catalyst between the NOx stored by the catalyst and the discharged unburnt gas components.

When the rich-spike causes the internal combustion engine to discharge a large amount of unburnt gas components, the exhaust gas flowing past the NSR catalyst becomes stoichiometric as long as there remains, in the catalyst, NOx to be reduced by the unburnt gas components. After the NOx adsorbed by the catalyst has all been reduced, the exhaust gas becomes richer because some unburnt gas components start to flow past the catalyst. Therefore, the above conventional system is designed to detect such an exhaust gas change into a rich one, which occurs downstream of the catalyst, by monitoring oxygen concentration or nitrogen oxide concentration, and the timing of that detection is followed by termination of the rich-spike. This prevents the rich-spike from being caused in an excessive manner, thereby also preventing deterioration of fuel consumption.

Patent Document 1: JP-A-2001-271679
Patent Document 2: JP-A-2009-114879

BRIEF SUMMARY OF THE INVENTION

Problem to be Solved by the Invention

In the above conventional system, the NOx adsorbed by the NSR catalyst is reduced by causing a rich-spike. However, during the rich-spike, part of the adsorbed NOx may occasionally flow through the catalyst. In other words, when the rich-spike causes unburnt gas components (i.e., reductants) to be introduced into the NSR catalyst, the NOx adsorbed by the catalyst is detached therefrom, causing reactions on the catalyst. At this time, however, part of the detached NOx will flow past the catalyst without being purified by the catalyst.

To purify such escaping NOx, a NOx selective catalytic reduction (hereinafter referred to as an "SCR") can be installed downstream of the NSR catalyst. The SCR can primarily adsorb the $NH_3$ generated within the NSR catalyst. Thus, the SCR is capable of selectively purifying the NOx that has passed through the NSR catalyst using the adsorbed $NH_3$.

Note, however, that when the $NH_3$ stored by the SCR becomes scarce, the NOx purification performance of the SCR will decrease accordingly. For this reason, there has been a demand for clarifying the mechanism of $NH_3$ generation and developing a system capable of generating large amounts of $NH_3$, so that the emission performance deterioration due to lack of $NH_3$ can be prevented.

The present invention has been contrived to address the above issue, and an object of the invention is to provide an exhaust purification system for an internal combustion engine having both of an NSR catalyst and an SCR, the system having the capability of preventing the deterioration of emission performance due to unadsorbed NOx.

Means for Solving the Problems

In accomplishing the above object, according to a first aspect of the present invention, there is provided an exhaust purification system for an internal combustion engine capable of lean-burn driving, the system comprising:

a NOx storage reduction catalyst (hereinafter referred to as an NSR catalyst) disposed in an exhaust passageway of the internal combustion engine;

a NOx selective catalytic reduction (hereinafter referred to as an SCR) disposed downstream of the NSR catalyst;

an exhaust sensor, disposed downstream of the SCR, for producing output in response to NOx concentration;

rich-spike means for causing a rich-spike at a particular timing during the lean-burn driving; and NOx-quantity augmenting means for increasing the amount of NOx contained in exhaust gas discharged during the rich-spike, in the event that the exhaust sensor has produced output indicative of a NOx concentration higher than a given NOx concentration.

According to a second aspect of the present invention, there is provided the system as described in the first aspect, wherein the NOx-quantity augmenting means includes stoichiometric-spike means for achieving a stoichiometric air-fuel ratio during the rich-spike caused at a particular timing, in the event that the internal combustion engine is being operated under a given high-load condition.

According to a third aspect of the present invention, there is provided the system as described in the first or second aspects, wherein the NOx-quantity augmenting means includes gas-quantity augmenting means for increasing the amount of exhaust gas during the rich-spike, in the event that the internal combustion engine is being operated under a given low-load condition.

According to a fourth aspect of the present invention, there is provided the system as described in any one of the first to third aspects, further comprising:

ignition-timing control means for controlling an ignition timing of the internal combustion engine; and floor-temperature acquisition means for acquiring a floor temperature of the NSR catalyst, wherein the NOx-quantity augmenting means includes igniting-timing advancing means for advancing the ignition timing before MBT timing during the rich-spike, in the event that the internal combustion engine is being operated under a given high-load condition and also that the floor temperature of the NSR catalyst is higher than a given temperature.

According to a fifth aspect of the present invention, there is provided the system as described in any one of the first to fourth aspects, wherein the NOx-quantity augmenting means includes slight-richness achieving means for achieving a slightly rich air-fuel ratio during the rich-spike, in the event that the internal combustion engine is being operated under a given low-load condition.

According to a sixth aspect of the present invention, there is provided the system as described in any one of the first to fifth aspects, further comprising exhaust gas recirculation (EGR) means for recirculating part of exhaust gas flowing inside the exhaust passageway into an intake passageway of the internal combustion engine, wherein the NOx-quantity augmenting means includes means for prohibiting the operation of the EGR means in the event that the internal combustion engine is being operated under a given low-load condition and also that the rich-spike is being caused.

According to a seventh aspect of the present invention, there is provided the system as described in any one of the first to sixed aspects, further comprising multi-injection means for performing multiple fuel injections during a single stroke, wherein the NOx-quantity augmenting means includes means for operating the multi-injection means in the event that the internal combustion engine is being operated under a given low-load condition and also that the rich-spike is being caused.

According to a eighth aspect of the present invention, there is provided the system as described in any one of the first to seventh aspects, further comprising prohibiting means for prohibiting the operation of the NOx-quantity augmenting means when the exhaust sensor has produced output indicative of a NOx concentration lower than a given NOx concentration.

Effects of the Invention

According to the above first aspect of the invention, when the NOx concentration on the downstream side of the SCR is higher than a given NOx concentration, the NOx contained in the exhaust gas discharged during the rich-spike is increased in amount. The larger the amount of NOx flowing into the NSR catalyst during the rich-spike, the more easily the NSR catalyst produces a large amount of $NH_3$. Thus, in this aspect of the invention, a large amount of $NH_3$ can be supplied to the SCR when the $NH_3$ stored by the SCR is scarce. This effectively prevents the deterioration of NOx emission performance due to lack of $NH_3$ in the SCR.

According to the above second aspect of the invention, when the internal combustion engine is being operated under a given high-load condition, the air-fuel ratio is made stoichiometric during the rich-spike caused at a particular timing. Stoichiometric combustion leads to generation of a large amount of NOx and also has less influence on the torque. Thus, this aspect of the invention allows a large amount of NOx to be introduced into the NSR catalyst while at the same time satisfying the conditions required under a high-load condition.

According to the above third aspect of the invention, when the internal combustion engine is being operated under a given low-load condition, the amount of exhaust gas is increased during the rich-spike. This gas amount increase during the rich-spike results in an increase in the amount of NOx flowing into the NSR catalyst. Also, when the internal combustion engine is being operated under a low-load condition, increasing the gas amount during the rich-spike has less influence on fuel consumption. Thus, this aspect of the invention allows a large amount of NOx to be introduced into the NSR catalyst while at the same time preventing deterioration of fuel consumption.

According to the above fourth aspect of the invention, in the event that the internal combustion engine is being operated under a given high-load condition and also that the floor temperature of the NSR catalyst is higher than a given temperature, the ignition timing is advanced during the rich-spike. Advancing the ignition timing during the rich-spike will result in a decrease in exhaust gas temperature, but a stable torque can be ensured with ease. Therefore, this aspect of the invention allows a large amount of NOx to be introduced into the NSR catalyst while at the same time satisfying the conditions required under a high-load condition.

According to the above fifth aspect of the invention, when the internal combustion engine is being operated under a given low-load condition, the air-fuel ratio is made slightly rich during the rich-spike. Thus, this aspect of the invention allows an increase in the NOx concentration of exhaust gas, thereby increasing the amount of $NH_3$ generated by the NSR catalyst.

According to the above sixth aspect of the invention, when the internal combustion engine is being operated under a given low-load condition, exhaust gas recirculation is prohibited during the rich-spike. This aspect of the invention prevents the in-cylinder combustion temperature from decreasing due to exhaust gas recirculation, thereby facilitating NOx generation in an effective manner.

According to the above seventh aspect of the invention, when the internal combustion engine is being operated under a given low-load condition, multiple fuel injections are performed during the rich-spike. Thus, this aspect of the invention facilitates formation of an air-fuel mixture and increases the in-cylinder combustion temperature, thereby facilitating NOx generation in an effective manner.

According to the above eighth aspect of the invention, when the NOx concentration on the downstream side of the SCR has become lower than a given NOx concentration, the operation of the NOx-quantity augmenting means is prohibited. This aspect of the invention prevents execution of unnecessary control operations when the SCR stores a sufficient amount of $NH_3$.

MODE FOR CARRYING OUT THE INVENTION

Figure 1:
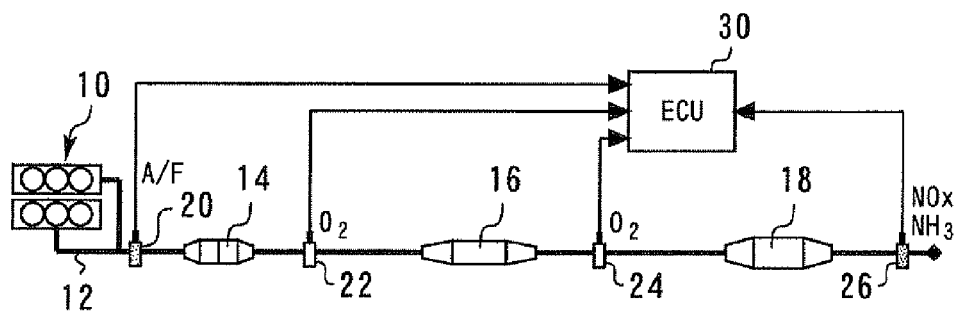
FIG. 1 is a schematic to illustrate the system configuration of Embodiment 1 of the present invention.

Some embodiments of the present invention will now be described with reference to the accompanying drawings. Note that common elements appearing in the drawings are given the same reference numerals and will not be described in a repetitive manner. It should also be noted that the embodiments described below are not meant to limit the present invention.

Embodiment 1

[System Configuration of Embodiment 1]

FIG. 1 illustrates the system configuration of Embodiment 1 of the present invention. As illustrated in the figure, the system of Embodiment 1 includes an internal combustion engine (or simply an engine) 10. The exhaust side of the engine 10 is in communication with an exhaust passageway 12. Disposed within the exhaust passageway 12 is a starting catalyst 14 (hereinafter referred to as the SC 14), which is a three-way catalyst. Also, in the exhaust passageway 12, a NOx storage reduction (NSR) catalyst 16 is installed downstream of the SC 14. In addition, a NOx selective catalytic reduction 18 (hereinafter referred to as the SCR 18) is located downstream of the NSR catalyst 16 in the exhaust passageway 12.

The engine 10 tends to discharge HC and CO when the air-fuel ratio is rich and NOx when the ratio is lean. Under lean conditions, the SC 14 reduces NOx (or purifies NOx into $N_2$) while adsorbing oxygen ($O_2$). Under rich conditions, in contrast, the SC 14 oxidizes HC and CO into $H_2O$ and $CO_2$, respectively, while discharging oxygen. Also, under rich conditions, the SC 14 causes the nitrogen contained in exhaust gas to react with hydrogen, thereby generating ammonia ($NH_3$).

The NSR catalyst 16 adsorbs the NOx contained in exhaust gas under lean conditions and discharges the adsorbed NOx under rich conditions. The NOx discharged under rich conditions is reduced by HC and CO. As with the SC 14, the NOx reduction results in generation of $NH_3$.

The SCR 18 adsorbs the $NH_3$ generated by both of the SC 14 and the NSR catalyst 16 under rich conditions. Under lean conditions, the SCR 18 selectively reduces the NOx contained in exhaust gas, using the $NH_3$ as a reductant. The use of the SCR 18 effectively prevents the atmospheric discharge of the $NH_3$ and NOx that have passed through the NSR catalyst 16.

The exhaust passageway 12 of the system of FIG. 1 has an air-fuel ratio (A/F) sensor 20 installed upstream of the SC 14. This A/F sensor 20 is used to detect the air-fuel ratio of exhaust gas discharged from the engine 10. The system also has oxygen ($O_2$) sensors 22 and 24 installed within the exhaust passageway 12, with the former sensor 22 being located between the SC 14 and the NSR catalyst 16 and the latter sensor 24 being located between the NSR catalyst 16 and the SCR 18. These $O_2$ sensors 22 and 24 generate a signal in response to the oxygen concentration of exhaust gas. An NOx sensor 26 is also installed in the exhaust passageway 12, positioned downstream of the SCR 18. The NOx sensor 26 generates signals in response to the NOx and $NH_3$ concentrations of exhaust gas. Specifically, the NOx sensor 26 is designed to detect, under rich conditions, the $NH_3$ concentration of exhaust gas passing through the SCR 18 and, under lean conditions, the NOx concentration of the exhaust gas.

As illustrated in FIG. 1, the system of Embodiment 1 also includes an electronic control unit (ECU) 30. Various actuators are connected to the output of the ECU 30, such as a fuel injector and the like (not illustrated, though). Also, various sensors are connected to the input of the ECU 30, examples of which include the above-mentioned A/F sensor 20, $O_2$ sensors 22 and 24, NOx sensor 26, and other sensors for detecting the operating conditions and state of the engine 10. Based on various input information, the ECU 30 controls the state of the system of FIG. 1.

[System Operation of Embodiment 1]

(Functionality and Operation of the NSR Catalyst 16)

First described are the functionality and operation of the NSR catalyst 16. Under normal conditions, the ECU 30 runs the engine 10 at a lean air-fuel ratio (lean-burn driving). During lean-burn driving, larger amounts of oxidants such as NOx and the like are discharged than reductants such as HC, CO, and so on. Thus, an attempt to purify this exhaust gas using a three-way catalyst may not work because all the NOx cannot be purified for lack of reductants. Therefore, the system of Embodiment 1 has adopted the installation of the NSR catalyst 16 within the exhaust passageway 12. The NSR catalyst 16 has the function of adsorbing NOx as nitrates such as $Ba(No_3)_2$ and the like. Accordingly, the system of Embodiment 1 effectively prevents the atmospheric discharge of NOx even during lean-burn driving.

Note, however, that the NOx-adsorbing capability of the NSR catalyst 16 may decrease with an increase in the amount of NOx adsorption. For this reason, a long duration of lean-burn driving results in unadsorbed NOx flowing past the NSR catalyst 16. Thus, the system of Embodiment 1 is designed to perform rich-spike causing control by which the NOx adsorbed by the NSR catalyst 16 is detached therefrom on a regular basis. More specifically, at a particular timing when the adsorbing capability of the NSR catalyst 16 begins to decrease, the exhaust air-fuel ratio of the engine 10 is made temporarily rich (e.g., A/F=12). During this rich-spike period, the exhaust gas contains large amounts of reductants such as HC, CO, $H_2$, and so on. When these reductants are introduced into the NSR catalyst 16, the NOx adsorbed by the NSR catalyst 16 as nitrates is reduced to NO and detached from its bases. The detached NOx is then purified into $N_2$ and the like by the corresponding catalyst within the NSR catalyst 16. As above, by causing a rich-spike during lean-burn driving, the NOx adsorbed by the NSR catalyst 16 can be detached therefrom, thereby restoring the NOx-adsorbing capability In an effective manner.

(NOx Purification by the SCR 18)

Next described is the functionality of the SCR 18. As stated above, the NOx-adsorbing capability of the NSR catalyst 16 can be restored effectively by causing a rich-spike. However, the rich-spike will cause part of the NOx detached from the NSR catalyst 16 to flow downstream without being purified. Moreover, as also stated above, some NOx flows downstream without being adsorbed by the NSR catalyst 16 during lean-burn driving. When such escaping NOx is discharged into the atmosphere, the emission performance may deteriorate.

For this reason, the system of Embodiment 1 includes the SCR 18 so as to treat the NOx that has passed through the NSR catalyst 16. As stated above, the SCR 18 adsorbs the $NH_3$ generated by both of the SC 14 and the NSR catalyst 16 under rich conditions. The SCR 18 uses this adsorbed $NH_3$ to selectively reduce or purify the NOx that has passed through the NSR catalyst 16. This effectively prevents the atmospheric discharge of the NOx and deterioration of the emission performance.

It should be noted that, according to the present inventors, the reduction performed at the SCR 18 can be facilitated by making the floor temperature of the SCR 18 equal to or less than 500 degrees Celsius and preferably equal to 300 degrees Celsius or thereabout. Accordingly, in the system of Embodiment 1, the position of the SCR 18 is carefully chosen so as to make its floor temperature equal to about 300 degrees Celsius. This effectively prevents NOx from flowing past the SCR 18.

[Distinctive Operations Performed in Embodiment 1]

Figure 2:
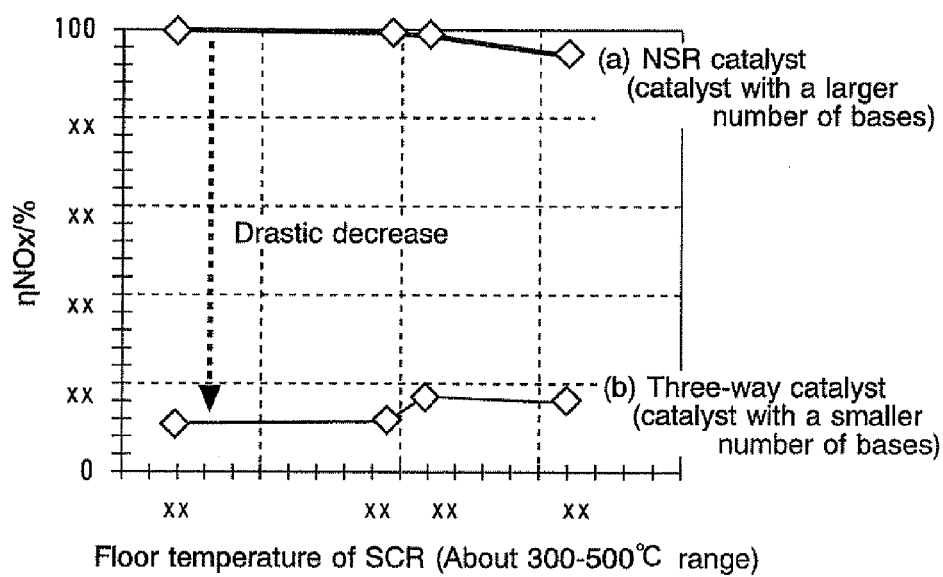
FIG. 2 is a graph illustrating the relationship between the floor temperature of an SCR 18 and the NOx purification rate achieved by the SCR 1.
Figure 3:
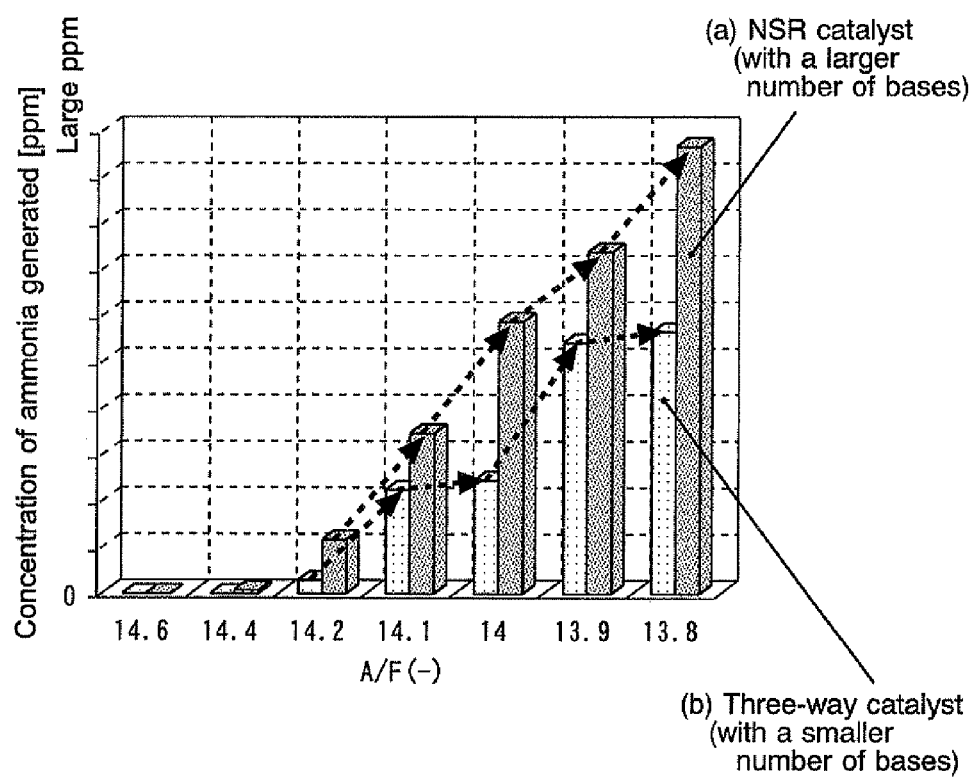
FIG. 3 is a graph illustrating the relationship between the exhaust air-fuel ratio and the concentrations of $NH_3$ generated by different catalysts.

With reference now to FIGS. 2 and 3, distinctive operations of Embodiment 1 will be described. As stated above, when a rich-spike is caused during lean-burn driving of the engine 10, the NOx adsorbed by the NSR catalyst 16 is purified into $N_2$ and the like, and $NH_3$ is also generated as an intermediate byproduct of the purification process. The generated $NH_3$ is adsorbed by the SCR 18 located downstream of the NSR catalyst 16 and used for the purification of NOx.

Note here that when the $NH_3$ adsorbed by the SCR 18 becomes scarce, the NOx flowing into the SCR 18 may not be purified effectively. To address this issue, the present inventors have conducted a study on the mechanism of $NH_3$ generation. FIG. 2 is a graph illustrating the relationship between the floor temperature of the SCR 18 and the NOx purification rate achieved by the SCR 18. In the graph, Curve (a) represents the NOx purification rate achieved when the NSR catalyst 16 was installed upstream of the SCR 18, while Curve (b) represents the NOx purification rate achieved when a three-way was installed upstream of the SCR 18 in place of the NSR catalyst 16. As can be seen, the installation of the three-way catalyst resulted in a drastic decrease in the NOx purification rate of the SCR 18. The result implies that the effective use of a catalyst having a larger number of bases like the NSR catalyst 16 is suited for the purpose of increasing the amount of $NH_3$ generation.

The present inventors have also conducted studies on how the exhaust air-fuel ratio affects the amount of $NH_3$ generation. FIG. 3 is a bar graph illustrating the relationship between the exhaust air-fuel ratio and the concentrations of $NH_3$ generated by different catalysts. In the graph, Bars (a) represent the concentrations of $NH_3$ generated by the NSR catalyst 16, while Bars (b) represent the concentrations of $NH_3$ generated by a three-way catalyst.

As the graph reveals, when the air-fuel ratio is somewhere between stoichiometric and slightly rich, $NH_3$ is generated not only by the NSR catalyst 16 but also by the three-way catalyst having a smaller number of bases. This would be a result of the large amount of NOx inherently contained in a stoichiometric gas. Thus, the result of FIG. 3 implies that the effective use of a stoichiometric atmosphere is suited for the purpose of increasing the amount of $NH_3$ generation.

Therefore, to generate $NH_3$ in an effective manner, it is important to effectively utilize a stoichiometric atmosphere and introduce a large amount of NOx into the NSR catalyst 16. Accordingly, when the $NH_3$ adsorbed by the SCR 18 has been judged scarce, the present embodiment will perform the following control operations, so that the NOx contained in the exhaust gas discharged during a rich-spike can be increased in amount.

(Gas-Quantity Augmenting Control During a Rich-Spike)

An increase in exhaust gas quantity will lead to an increase in NOx amount. Thus, in the present embodiment, the gas quantity is increased during a rich-spike. This allows a large amount of NOx to be introduced into the SC 14 and the NSR catalyst 16, thereby increasing the amount of $NH_3$ generation in an effective manner. This control operation, however, will also result in an increase in the amount of fuel injection, compromising fuel consumption. For this reason, Embodiment 1 is designed to perform this control operation only when the engine 10 is being operated under a low-load condition. This allows the amount of $NH_3$ generation to be increased effectively while at the same time preventing deterioration of fuel consumption.

(Stoichiometric-Spike Control)

As stated above, a large amount of NOx is contained in a stoichiometric gas. Thus, in Embodiment 1, the air-fuel ratio is made stoichiometric during a rich-spike caused at a particular timing. This means that stoichiometric-spike is exercised during the time interval of causing a rich-spike; consequently, a large amount of NOx can be introduced into the SC 14 and the NSR catalyst 16. Note, however, that in terms of the amount of $NH_3$ generation, the above-mentioned gas-quantity augmenting control is more desirable than this stoichiometric-spike control, but still, the latter control is also advantageous in that it has less influence on the torque. Therefore, Embodiment 1 is designed to exercise the stoichiometric-spike control only when the engine 10 is being operated under a high-load condition. This allows the amount of $NH_3$ generation to be increased effectively while at the same time satisfying the torque required under a high-load condition.

[Specific Operations Performed in Embodiment 1]

Figure 4:
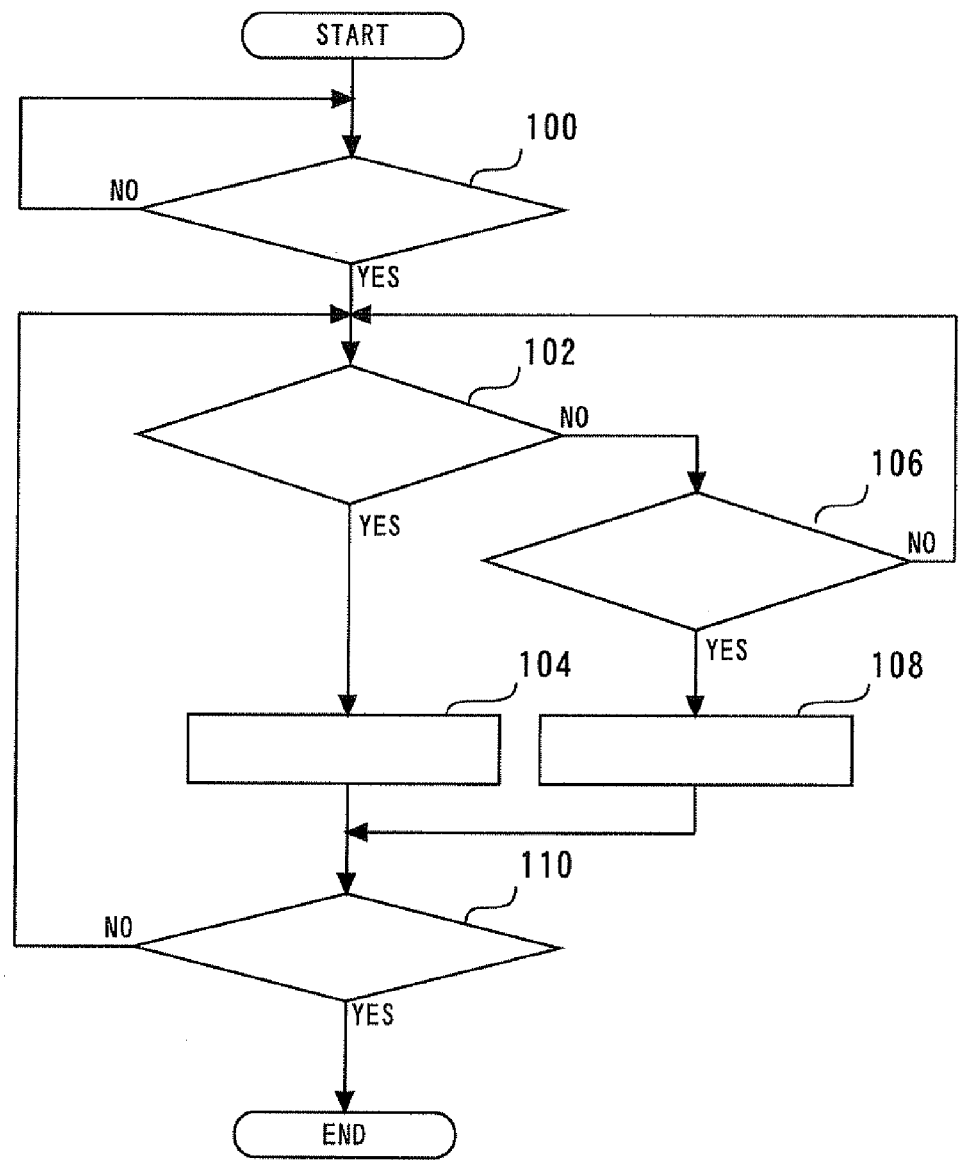
FIG. 4 is a flowchart illustrating a routine executed in Embodiment 1 of the present invention.

Next, specific operations performed in Embodiment 1 will be described with reference to FIG. 4. FIG. 4 is a flowchart illustrating a routine executed by the ECU 30. Note that the routine of FIG. 4 is repeated during lean-burn driving of the engine 10.

The routine of FIG. 4 starts with Step 100 in which a judgment is made as to whether the $NH_3$ stored by the SCR 18 is scarce or not. More specifically, the ECU 30 judges whether a value detected by the NOx sensor 26 is larger than a given concentration (e.g., 2 ppm) or not. When the condition that the detected value >2 ppm is not met, the $NH_3$ stored by the SCR 18 is judged not scarce, resulting in the repetition of this Step 100.

When, on the other hand, the above condition that the detected value >2 ppm is met in Step 100, the purification performance of the SCR 18 is judged to have decreased, and the routine proceeds to Step 102 in which a judgment is made as to whether the engine 10 is being operated under a given high-load condition. More specifically, the ECU 30 judges whether or not the conditions that engine load KL>60 and engine revolution speed NE>2,800 rpm are met. When those conditions are met (KL>60 and NE>2,800 rpm), it is determined that the engine 10 is being operated under a high-load condition, and the routine proceeds to Step 104 in which the stoichiometric-spike control is exercised. In this step, the air-fuel ratio is made stoichiometric during a rich-spike caused at a particular timing.

When, on the other hand, the above conditions that KL>60 and NE>2,800 rpm are not met in Step 102, the routine proceeds to Step 106 in which a judgment is made as to whether the engine 10 is being operated under a given low-load condition. Specifically, the ECU 30 judges whether or not the conditions that engine load XL<60 and engine revolution speed NE<2,800 rpm are met. When those conditions are not met (XL<60 and NE<2,800 rpm), the routine returns to Step 102 to perform it again. When, on the other hand, the conditions that XL<60 and NE<2,800 rpm are met in Step 106, it is determined that the engine 10 is being operated under a low-load condition, and the routine proceeds to Step 108 in which the gas-quantity augmenting control is performed during a rich-spike.

After the execution of Step 104 or 108, a judgment is made in Step 110 as to whether the emission level of NOx has decreased or not. Specifically, the ECU 30 judges whether or not a value detected by the NOx sensor 26 is lower than a given concentration (e.g., 2 ppm). When this condition that the detected value <2 ppm is not met, the $NH_3$ stored by the SCR 18 is judged still scarce, and the routine returns to Step 102 to perform it again. When, on the other hand, the condition that the detected value <2 ppm is satisfied in Step 110, it is determined that the SCR 18 has adsorbed a sufficient amount of $NH_3$, resulting in termination of this routine.

As described above, in the event that the $NH_3$ stored by the SCR 18 is scarce and also that the engine 10 is being operated under a given high-load condition, the system of Embodiment 1 exercises the stoichiometric-spike control. This increases the amount of NOx in exhaust gas while at the same time satisfying the torque required under a high-load condition.

Further, in the event that the $NH_3$ stored by the SCR 18 is scarce and also that the engine 10 is being operated under a given low-load condition, the system of Embodiment 1 increases the amount of exhaust gas during a rich-spike. This increases the amount of NOx in the exhaust gas while at the same time preventing deterioration of fuel consumption.

Furthermore, when the NOx concentration on the downstream side of the SCR 18 has decreased to a given value, the system of Embodiment 1 prohibits the stoichiometric-spike control as well as the gas-quantity augmenting control during a rich-spike. This effectively prevents the deterioration of drivability and fuel consumption due to unnecessary control operations.

As stated above, in Embodiment 1, the amount of exhaust gas is increased during a rich-spike in the event that the $NH_3$ stored by the SCR 18 is scarce and also that the engine 10 is being operated under a given low-load condition. It should be noted however that there are other methods as well for increasing the amount of NOx in exhaust gas. For instance, if the engine 10 includes an exhaust gas recirculation (EGR) system, it is possible to prohibit an EGR operation during a rich-spike while at the same time exercising (or without exercising) the gas-quantity augmenting control. This prevents the in-cylinder combustion temperature from decreasing, thereby further facilitating the generation of NOx. Also, if the engine 10 includes a multi-injection fuel injector capable of performing several injections during a single-stroke, it is possible to perform multiple injections during a rich-spike while at the same time exercising (or without exercising) the gas-quantity augmenting control. This facilitates formation of an air-fuel mixture and effectively increases the in-cylinder combustion temperature, thereby further facilitating the generation of NOx.

Moreover, while Embodiment 1 is designed to increase the amount of exhaust gas during a rich-spike in the event that the $NH_3$ stored by the SCR 18 is scarce and also that the engine 10 is being operated under a given low-load condition, it is instead possible to exercise the slight-richness achieving control of Embodiment 2 described later, in place of the gas-quantity augmenting control.

The following should be noted. In the above-described embodiment 1, The NSR catalyst 16, the SCR 18, and the NOx sensor 26 correspond respectively to the "NSR catalyst," "SCR," and "exhaust sensor" of the first aspect of the present invention described earlier. Also, in the above-described embodiment 1, the "NOx-quantity augmenting means" of the first aspect of the invention is implemented by the ECU 30 executing Step 104 or 108 described above.

Further, in the above-described embodiment 1, the "stoichiometric-spike means" of the second aspect of the invention is implemented by the ECU 30 executing Step 104.

Furthermore, in the above-described embodiment 1, the "gas-quantity augmenting means" of the third aspect of the invention is implemented by the ECU 30 executing Step 108.

Moreover, in the above-described embodiment 1, the "prohibiting means" of the eighth aspect of the invention is implemented by the ECU 30 executing Step 110 described above.

Embodiment 2

[Distinctive Features of Embodiment 2]

Figure 5:
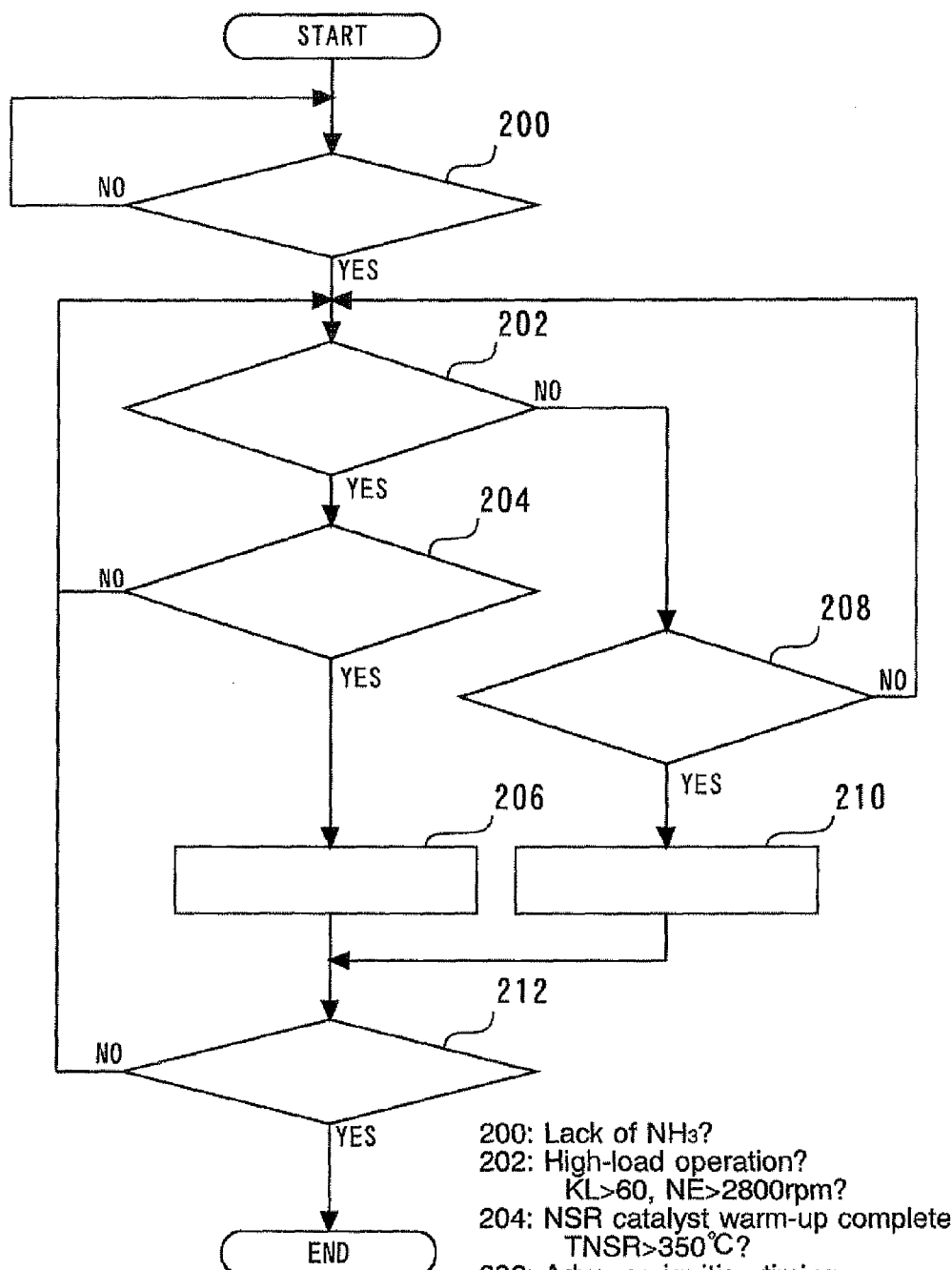
FIG. 5 is a flowchart illustrating a routine executed in Embodiment 2 of the present invention.

With reference to FIG. 5, Embodiment 2 of the present invention will next be described. The system of Embodiment 2 can be implemented by using the hardware configuration of FIG. 1 and by having the ECU 30 execute the routine of FIG. 5 described below.

When the $NH_3$ stored by the SCR 18 is scarce, Embodiment 2 is designed to perform control operations different from those performed in Embodiment 1, so that the NOx contained in the exhaust gas discharged during a rich-spike can be increased in amount. The following is a detailed description of those control operations of Embodiment 2.

(Ignition-Timing Advancing Control During a Rich-Spike)

Advancing the ignition timing stabilizes combustion. Thus, doing so ensures a relatively stable torque with ease, even when the engine 10 is being operated under high-load conditions. In Embodiment 2, therefore, when the engine 10 is being operated under high-load conditions, the ignition timing is advanced before the MBT timing during a rich-spike. This ensures a stable torque and effectively increases the amount of NOx in exhaust gas without compromising fuel consumption. Note, however, that advancing the ignition timing will result in a decrease in exhaust gas temperature. Accordingly, Embodiment 2 is designed to perform this ignition-timing advancing control only when the NSR catalyst 16 has been warmed up enough. This effectively prevents the NSR catalyst 16 from becoming less active.

(Slight-Richness Achieving Control During a Rich-Spike)

As stated above, a larger amount of NOx is contained in a stoichiometric gas than in a rich gas. Thus, in Embodiment 2, the air-fuel ratio is made slightly rich (e.g., A/F=13.5) during a rich-spike. Consequently, a large amount of NOx can be introduced into the SC 14 and the NSR catalyst 16. However, if this control is performed under high-load conditions, a stable torque may not be obtained. Accordingly, Embodiment 2 is designed to perform the slight-richness achieving control only when the engine 10 is being operated under low-load conditions. This effectively increases the amount of $NH_3$ generation while preventing deterioration of drivability.

[Specific Operations Performed in Embodiment 2]

Next, specific operations performed in Embodiment 2 will be described with reference to FIG. 5. FIG. 5 is a flowchart illustrating a routine executed by the ECU 30. Note that the routine of FIG. 5 is repeated during lean-burn driving of the engine 10.

The routine of FIG. 5 starts with Step 200 in which a judgment is made as to whether the $NH_3$ stored by the SCR 18 is scarce or not. More specifically, the ECU30 performs the same operation as in Step 100 of FIG. 4. When the condition that a detected value >2 ppm is not met, the $NH_3$ stored by the SCR 18 is judged not scarce, resulting in the repetition of this Step 200.

When, on the other hand, the above condition that the detected value >2 ppm is met in Step 200, the purification performance of the SCR 18 is judged to have decreased, and the routine proceeds to Step 202 in which a judgment is made as to whether the engine 10 is being operated under a given high-load condition. More specifically, in Step 202, the ECU 30 performs the same operation as in Step 102 of FIG. 4. When the conditions that KL>60 and NE>2,800 rpm are met, it is determined that the engine 10 is being operated under a high-load condition, and the routine proceeds to Step 204 in which a judgment is made as to whether the NSR catalyst 16 has been warmed up enough or not. Specifically, in Step 204, the ECU 30 judges whether or not the floor temperature $T_{NSR}$ of the NSR catalyst 16 has reached a given temperature indicative of the completion of the warm-up (e.g., 350 degrees Celsius). When the condition that the floor temperature $T_{NSR}$>350 degrees Celsius is not met, it is determined that exercising the ignition-timing advancing control described below will result in a decrease in the catalytic activity of the NSR catalyst 16, and the routine then returns to Step 202 to perform it again.

When, on the other hand, the condition that the floor temperature $T_{NSR}$>350 degrees Celsius is met in Step 204, the routine proceeds to Step 206 in which the ECU 30 performs the ignition-timing advancing control. More specifically, the ignition timing is advanced before the MBT timing during a rich-spike.

When, in Step 202, the conditions that KL>60 and NE>2, 800 rpm are not met, the routine proceeds to Step 208 in which a judgment is made as to whether the engine 10 is being operated under a low-load condition or not. Specifically, in Step 208, the ECU 30 performs the same operation as in Step 106 of FIG. 4. When the conditions that KL<60 and NE<2, 800 rpm are not met, the routine returns to Step 202 to perform it again. When, on the other hand, the conditions that KL<60 and NE<2,800 rpm are met in Step 208, it is determined that the engine 10 is being operated under a low-load condition, and the routine proceeds to Step 210 in which the slight-richness achieving control is performed during a rich-spike. Specifically, the air-fuel ratio is made slightly rich (e.g., A/F=13.5) during a rich-spike.

After the execution of Step 206 or 210, a judgment is made in Step 212 as to whether the emission level of NOx has decreased or not. Specifically, in Step 212, the ECU 30 performs the same operation as in Step 110 of FIG. 4. When the condition that a detected NOx value<2 ppm is not met, the $NH_3$ stored by the SCR 18 is judged still scarce, and the routine returns to Step 202 to perform it again. When, on the other hand, the condition that the detected value<2 ppm is satisfied in Step 212, it is determined that the SCR 18 has adsorbed a sufficient amount of $NH_3$, resulting in termination of this routine.

As described above, in the event that the $NH_3$ stored by the SCR 18 is scarce, that the engine 10 is being operated under a given high-load condition, and also that the NSR catalyst 16 has been warmed up completely, the system of Embodiment 2 exercises the ignition-timing advancing control. This increases the amount of NOx in exhaust gas while at the same time satisfying the torque required under a high-load condition.

Further, in the event that the $NH_3$ stored by the SCR 18 is scarce and also that the engine 10 is being operated under a given low-load condition, the system of Embodiment 2 makes the air-fuel ratio slightly rich during a rich-spike. This increases the amount of NOx in the exhaust gas while at the same time preventing deterioration of drivability.

Furthermore, when the NOx concentration on the downstream side of the SCR 18 has decreased to a given value, the system of Embodiment 2 prohibits the ignition-timing advancing control as well as the slight-richness achieving control. This effectively prevents the deterioration of drivability and fuel consumption due to unnecessary control operations.

As stated above, in Embodiment 2, the air-fuel ratio is made slightly rich during a rich-spike in the event that the $NH_3$ stored by the SCR 18 is scarce and also that the engine 10 is being operated under a given low-load condition. It should be noted however that there are other methods as well for increasing the amount of NOx in exhaust gas. For instance, if the engine 10 includes an exhaust gas recirculation (EGR) system, it is possible to prohibit an EGR operation during a rich-spike while at the same time exercising (or without exercising) the slight-richness achieving control. This prevents the in-cylinder combustion temperature from decreasing, thereby further facilitating the generation of NOx. Also, if the engine 10 includes a multi-injection fuel injector capable of performing several injections during a four-stroke cycle, it is possible to perform multiple injections during a rich-spike while at the same time exercising (or without exercising) the slight-richness achieving control. This facilitates formation of an air-fuel mixture and effectively increases the in-cylinder combustion temperature, thereby further facilitating the generation of NOx.

Moreover, while Embodiment 2 is designed to make the air-fuel ratio slightly rich during a rich-spike in the event that the $NH_3$ stored by the SCR 18 is scarce and also that the engine 10 is being operated under a given low-load condition, it is instead possible to exercise the gas-quantity augmenting control of Embodiment 1 during the rich-spike, in place of this slight-richness achieving control.

The following should be noted. In the above-described embodiment, the NSR catalyst 16, the SCR 18, and the NOx sensor 26 correspond respectively to the "NSR catalyst," "SCR," and "exhaust sensor" of the first aspect of the present invention described earlier. Also, in the above-described third embodiment, the "NOx-quantity augmenting means" of the first aspect of the invention is implemented by the ECU 30 executing Step 206 or 210 described above.

Further, in the above-described embodiment 2, the "ignition-timing advancing means" of the fourth aspect of the invention is implemented by the ECU 30 executing Step 206.

Furthermore, in the above-described embodiment, the "slight-richness achieving means" of the fifth aspect of the invention is implemented by the ECU 30 executing Step 210.

Moreover, in the above-described embodiment, the "prohibiting means" of the eighth aspect of the invention is implemented by the ECU 30 executing Step 212 described above.

DESCRIPTION OF REFERENCE CHARACTERS

10: internal combustion engine (engine)
12: exhaust passageway
14: start catalyst (SC)
16: NOx storage-reduction catalyst (NSR catalyst)
18: NOx selective catalytic reduction (SCR)
20: A/F sensor
22: $O_2$ sensor
24: $O_2$ sensor
26: NOx sensor
30: ECU (electronic control unit)

The invention claimed is:

1. An exhaust purification system for an internal combustion engine capable of lean-burn driving, the system comprising:
   a NOx storage reduction (NSR) catalyst disposed in an exhaust passageway of the internal combustion engine;
   a NOx selective catalytic reduction (SCR) catalyst disposed downstream of the NSR catalyst;
   an exhaust sensor, disposed downstream of the SCR catalyst, for producing output in response to NOx concentration; and
   an electronic control unit programmed to cause a rich-spike at a particular timing during the lean-burn driving,
   increase the amount of NOx contained in exhaust gas discharged during the rich-spike, in the event that the exhaust sensor has produced output indicative of a NOx concentration higher than a given NOx concentration, and
   increase the amount of exhaust gas during the rich-spike, in the event that the internal combustion engine is being operated under a given low-load condition.

2. The system according to claim 1, wherein the electronic control unit is further programmed to provide a stoichiometric air-fuel ratio during the rich-spike caused at a particular timing, in the event that the internal combustion engine is being operated under a given high-load condition.

3. The system according to claim 1, wherein the electronic control unit is further programmed to control an ignition timing of the internal combustion engine,
- acquire a floor temperature of the NSR catalyst, and
- advance the ignition timing before MBT timing during the rich-spike, in the event that the internal combustion engine is being operated under a given high-load condition and also that the floor temperature of the NSR catalyst is higher than a given temperature.

4. The system according to claim 1, wherein the electronic control unit is further programmed to provide a slightly rich air-fuel ratio during the rich-spike, in the event that the internal combustion engine is being operated under a given low-load condition.

5. The system according to claim 1, wherein the electronic control unit is further programmed to perform multiple fuel injections during a single stroke in the event that the internal combustion engine is being operated under a given low-load condition and also that the rich-spike is being caused.

6. The system according to claim 1, wherein the electronic control unit prohibits increasing the amount of NOx contained in the exhaust gas when the exhaust sensor has produced output indicative of a NOx concentration lower than a given NOx concentration.

7. An exhaust purification system for an internal combustion engine capable of lean-burn driving, the system comprising:
- a NOx storage reduction (NSR) catalyst disposed in an exhaust passageway of the internal combustion engine;
- a NOx selective catalytic reduction (SCR) catalyst disposed downstream of the NSR catalyst;
- an exhaust sensor, disposed downstream of the SCR catalyst, for producing output in response to NOx concentration;
- rich-spike device for causing a rich-spike at a particular timing during the lean-burn driving; and
- NOx-quantity augmenting device for increasing the amount of NOx contained in exhaust gas discharged during the rich-spike, in the event that the exhaust sensor has produced output indicative of a NOx concentration higher than a given NOx concentration,
- wherein the NOx-quantity augmenting device includes gas-quantity augmenting device for increasing the amount of exhaust gas during the rich-spike, in the event that the internal combustion engine is being operated under a given low-load condition.

* * * * *